(12) United States Patent
Murasato et al.

(10) Patent No.: US 11,778,697 B2
(45) Date of Patent: Oct. 3, 2023

(54) HEATING APPARATUS FOR WINDOW GLASS OF VEHICLE

(71) Applicant: TOYOTA JIDOSHA KABUSHIKI KAISHA, Toyota (JP)

(72) Inventors: Hideyuki Murasato, Nagoya (JP); Takahiro Adachi, Chiryu (JP); Toshifumi Kawasaki, Toyota (JP); Masami Nagano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 459 days.

(21) Appl. No.: 17/031,064

(22) Filed: Sep. 24, 2020

(65) Prior Publication Data

US 2021/0105870 A1  Apr. 8, 2021

(30) Foreign Application Priority Data

Oct. 4, 2019  (JP) .................................. 2019-183897

(51) Int. Cl.
| | |
|---|---|
| *H05B 1/02* | (2006.01) |
| *H05B 3/84* | (2006.01) |
| *B60S 1/02* | (2006.01) |
| *B60J 1/00* | (2006.01) |
| *B60R 1/04* | (2006.01) |
| *B60R 11/00* | (2006.01) |

(52) U.S. Cl.
CPC ............ *H05B 1/0236* (2013.01); *B60J 1/002* (2013.01); *B60R 1/04* (2013.01); *B60S 1/026* (2013.01); *H05B 3/84* (2013.01); *B60R 2011/0026* (2013.01)

(58) Field of Classification Search
CPC . B60H 1/00785; B60H 1/00742; B60S 1/026; B60S 1/0848; H05B 3/84; H05B 1/0236; B60R 2011/0026; B60R 11/04; B60J 1/002
See application file for complete search history.

(56) References Cited

U.S. PATENT DOCUMENTS

| | | | |
|---|---|---|---|
| 2013/0041576 A1 | 2/2013 | Switkes et al. | |
| 2018/0056942 A1 | 3/2018 | Oikawa | |
| 2019/0279447 A1* | 9/2019 | Ricci | G06F 3/0304 |

FOREIGN PATENT DOCUMENTS

| | | | | |
|---|---|---|---|---|
| CA | 2977470 C | * | 10/2018 | ............... B60R 1/00 |
| JP | 2018-034522 A | | 3/2018 | |
| WO | WO-2022187805 A1 | * | 9/2022 | ............... B60R 1/04 |

* cited by examiner

*Primary Examiner* — Shawntina T Fuqua
(74) *Attorney, Agent, or Firm* — Sughrue Mion, PLLC (57) ABSTRACT

A window glass apparatus includes a heater for heating a part of a windshield which is a particular part of a window glass of a host vehicle, and a control ECU configured to control an amount of the electric power supplied to the heater. The control ECU detects a preceding vehicle and controls the amount of the electric power supplied to the heater in such a manner that the amount of the electric power supplied to the heater is reduced as compared with a case where the preceding vehicle is not detected, using information on the detected preceding vehicle.

4 Claims, 6 Drawing Sheets

HEATING APPARATUS FOR WINDOW GLASS OF VEHICLE

BACKGROUND OF THE INVENTION

1. Field of the Invention

The present invention relates to a window glass heating apparatus for heating a front window glass (i.e., windshield glass) of a vehicle to prevent the front window glass from being clouded and/or to remove a cloud of the front window glass.

2. Description of the Related Art

Hitherto, it has been thought that an amount of heat which is removed from the front window glass of a vehicle per unit time increases as a speed of the vehicle (vehicle speed) increases. This is because a strength/magnitude of a wind blowing toward (hitting) the front window glass is greater (i.e., the wind is stronger), as the vehicle speed is higher. Hereinafter, the front window glass (windshield glass) may be simply referred to as a "front glass". The wind blowing toward (hitting) the front window glass caused by traveling of the vehicle may be referred to as a traveling wind.

In view of the above, a known window glass heating apparatus (hereinafter, referred to as a "conventional apparatus") controls an amount of an electric power supplied to a heater for heating the window glass (for example, the front glass) in such a manner that an output (a heat value, or a power consumption) of the heater is increased as the vehicle speed is higher (refer to refer to Japanese Patent Application Laid-Open No. 2018-34522).

Consequently, it has been thought that the conventional apparatus can effectively prevent a "particular part within the front window glass" corresponding to an imaging range of an onboard camera from being clouded or can effectively remove the cloud of the particular part, regardless of the strength (magnitude) of the traveling wind.

When a preceding vehicle traveling in front of the vehicle (host vehicle) having the window glass heating apparatus) is present, the strength of the traveling wind hitting the front glass of the host vehicle is weaker than the strength of the traveling wind of when the preceding vehicle is not present. In other words, the amount of heat removed from the front window per unit time greatly differs depending on whether or not the preceding vehicle is present.

However, the conventional apparatus controls the amount of the electric power supplied to the heater based on the vehicle speed without taking into consideration the influence of the preceding vehicle on the traveling wind. That is, even when the traveling window hitting the front glass is weaken by the preceding vehicle, the conventional apparatus controls the amount of the electric power supplied to the heater in the same manner as the case where the preceding vehicle is not present. Consequently, according to the conventional apparatus, when the preceding vehicle is present, there may be a likelihood that the output of the heater is excessive; the electric power is wasted; and the onboard camera, camera fixing members, and the like are excessively heated.

SUMMARY OF THE INVENTION

The present invention has been made in order to cope with the above-described problem. That is, one of objects of the present invention is to provide "a heating apparatus of a window glass of a vehicle" capable of controlling an output of a heater appropriately even when the preceding vehicle is present. Hereinafter, the heating apparatus according to the present invention is also referred to as the "present invention heating apparatus".

The present invention heating apparatus of a front window glass (FG) of a host vehicle (10) includes:

a camera (20) configured to take an image of an outside of the host vehicle through a particular part (FGC) of the front window glass from an inside of the host vehicle to thereby obtain front image data used for a driving support of the host vehicle;

a vehicle speed sensor (62) configured to detect a vehicle speed of the host vehicle;

a heater (60), disposed inside the host vehicle so as to face with the particular part, and configured to generate heat for heating the particular part, an amount of the heat corresponding to an amount of electric power supplied from an electric power source of the host vehicle to the heater; and a control unit (60) configured to control the amount of the electric power supplied to the heater based on the detected vehicle speed and information on a preceding vehicle (OV) traveling in front of the host vehicle (refer to step 545), the information being obtained based on data including the front image data.

According to the present invention heating apparatus, when the amount of heat removed from the front window glass by the traveling wind decreases under the influence of the preceding vehicle, the amount of the electric power supplied to the heater can be reduced by an amount corresponding to a reduction amount in the amount of heat removed from the front window. Therefore, the present invention heating apparatus can appropriately control the output of the heater even when the preceding vehicle is present.

In one of aspects of the present invention heating apparatus, the control unit is configured to:
obtain a traveling wind influence parameter as the information on the preceding vehicle, the traveling wind influence parameter having a correlation with influence degree of the preceding vehicle on strength of wind caused by traveling of the host vehicle and hitting the front window glass of the host vehicle (refer to steps 515 and 610);

increase the amount of the electric power supplied to the heater as the vehicle speed becomes higher; and decrease the amount of the electric power supplied to the heater as the influence degree becomes greater, the influence degree being extrapolated based on the traveling wind influence parameter (refer to step 545).

Under the influence of the preceding vehicle, the amount of heat removed from the front window by the traveling wind reduces as the strength of the traveling wind becomes smaller. In view of the above, the above-mentioned aspect reduces the amount of the electric power supplied to the heater as the influence degree of the preceding vehicle on the strength of the traveling wind becomes greater. As a result, the above-mentioned aspect, even when the preceding vehicle is present, the output of the heater can be controlled more appropriately.

In one of aspects of the present invention heating apparatus, the traveling wind influence parameter includes a size evaluation parameter having a correlation with a size of the preceding vehicle; and the control unit is configured to extrapolate the influence degree in such a manner that the influence degree becomes greater as the size evaluation parameter becomes greater (refer to steps 530 and 550).

The strength of the traveling wind tends to become smaller as the size valuation parameter of the preceding vehicle becomes greater. In view of the above, the above-mentioned aspect extrapolates the influence degree in such a manner that the influence degree becomes greater as the size evaluation parameter becomes greater. As a result, the above-mentioned aspect can more appropriately control the output of the heater even when the preceding vehicle (having a various size) is present.

In one of aspects of the present invention heating apparatus,
the traveling wind influence parameter includes an inter-vehicle distance of the preceding vehicle, the inter-vehicle distance being a distance between the host vehicle and the preceding vehicle; and
the control unit is configured to extrapolate the influence degree in such a manner that the influence degree becomes greater as the inter-vehicle distance of the preceding vehicle becomes shorter (refer to steps 530 and 550).

The strength of the traveling wind tends to become smaller as the inter-vehicle distance of the preceding vehicle becomes shorter. In view of the above, the above-mentioned aspect extrapolates the influence degree in such a manner that the influence degree becomes greater as the inter-vehicle distance of the preceding vehicle becomes shorter. As a result, the above-mentioned aspect can more appropriately control the output of the heater even when the preceding vehicle (having a various inter-vehicle distance) is present.

In one of aspects of the present invention heating apparatus,
the traveling wind influence parameter includes an overlapping rate of the preceding vehicle with respect to the host vehicle; and
the control unit is configured to extrapolate the influence degree in such a manner that the influence degree becomes greater as the overlapping rate becomes larger (refer to steps 530 and 550).

The strength of the traveling wind tends to become smaller as the overlapping rate of the preceding vehicle becomes larger. In view of the above, the above-mentioned aspect can extrapolate the influence degree in such a manner that the influence degree becomes greater as the overlapping rate becomes larger. As a result, the above-mentioned aspect can appropriately control the output of the heater even when the preceding vehicle (having a various overlapping rate) is present.

In one of aspects of the present invention heating apparatus,
the traveling wind influence parameter includes the number of the preceding vehicles; and
the control unit is configured to extrapolate the influence degree in such a manner that the influence degree becomes greater as the number of the preceding vehicles increases (refer to steps 530 and 550).

The strength of the traveling wind tends to become smaller as the number of the preceding vehicles increases. In view of the above, the above-mentioned aspect extrapolates the influence degree in such a manner that the influence degree becomes greater as the number of the preceding vehicles increases. As a result, the above-mentioned aspect can appropriately control the output of the heater even when the preceding vehicle is present (the number of the preceding vehicles is different).

In the above description, the terms and/or the reference symbols used in the following description regarding embodiment are added with parentheses to the elements of the present invention heating apparatus, in order to assist in understanding the present invention. However, the terms and/or reference symbols should not be used to limit the scope of the invention.

DETAILED DESCRIPTION OF THE EMBODIMENT

Construction

Figure 1:
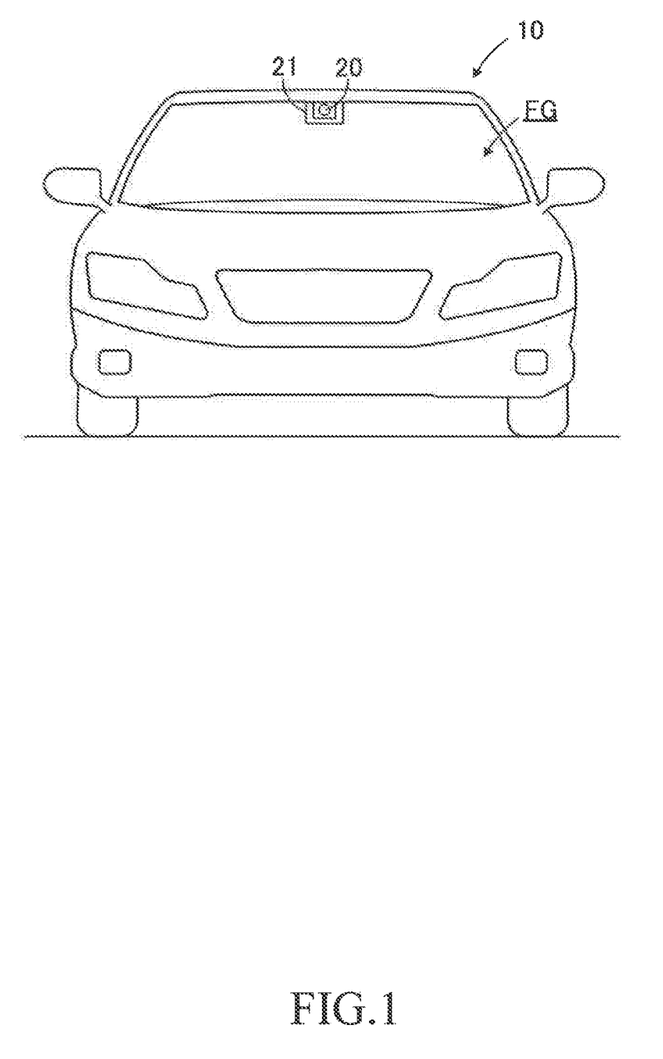
FIG. 1 is a front view of a vehicle (host vehicle) including a heating apparatus (a present heating apparatus) of a window glass of the vehicle according to an embodiment of the present invention.

A heating apparatus of a vehicle window glass according to the embodiment of the present invention is applied to a vehicle (host vehicle) 10 shown in FIG. 1. Hereinafter, the heating apparatus according to the embodiment of the present invention is referred to as a "present heating apparatus". The host vehicle 10 is a vehicle having an internal combustion engine as a driving source. The host vehicle 10 may be an electric vehicle or a hybrid vehicle.

Onboard Camera

The host vehicle 10 includes an onboard camera 20. The onboard camera 20 is placed in an interior space (a vehicle cabin) of the host vehicle 10 and in the vicinity of a center in a vehicle width direction of a front window glass (a windshield) FG and an upper position of the front window glass FG. Hereinafter, the front window glass FG is sometimes simply referred to as a "front glass FG". It should be noted that the installation position of the onboard camera 20 is not limited to the above-described position. The onboard camera 20 photographs (takes an image of) an outside (views/landscapes including an object outside the host vehicle 10) of the host vehicle 10 to generate image data (front image data), every time a predetermined time elapses. The image data are used for a driving support.

The onboard camera 20 is fixed in a camera housing 21. The camera housing 21 is a substantially rectangular parallelepiped case and holds the onboard camera 20.

Figure 2:
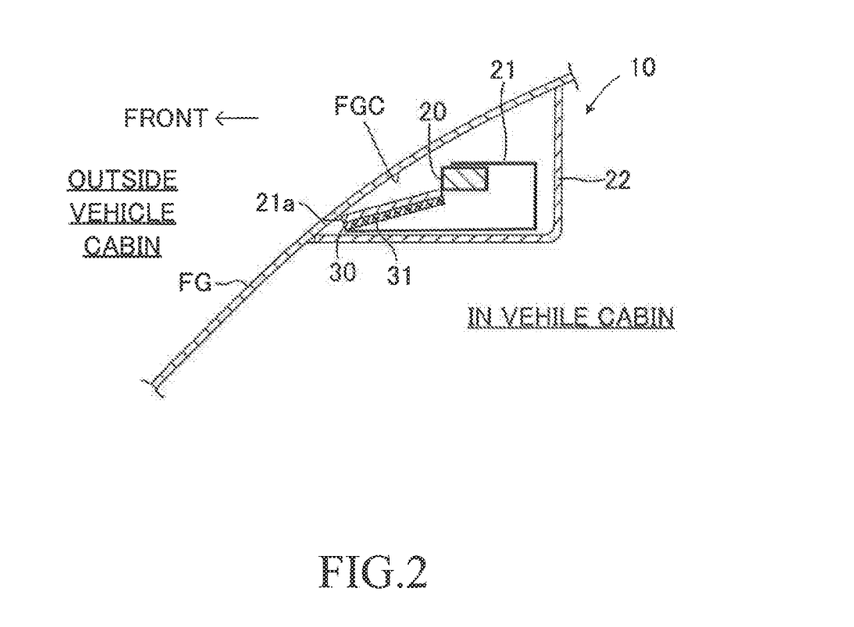
FIG. 2 is a side view of a part around an onboard camera of the vehicle equipped with the present heating apparatus.

As shown in FIG. 2, the camera housing 21 is fixed by a bracket 22 to a position located at an upper position of the center in the vehicle width direction of the front glass FG. Therefore, the onboard camera 20 is disposed at the position in the interior space of the host vehicle 10 and near the front glass FG.

The camera housing 21 includes a hood part 21a having a flat shape. The hood part 21a is configured to extend forward under the onboard camera 20 in a state where the camera housing 21 is fixed to the host vehicle 10. Therefore, an upper surface of the hood part 21a and the front glass FG face to each other and are inclined obliquely to each other. The heater 30 is attached to a lower (back) surface of the hood part 21a.

The heater 30 includes electric heating wires 31. When the electric power is supplied to the heater 30, the electric heating wires 31 generate heat. The heater 30 heats the hood part 21a using the heat generated by the electric heating wires 31 to thereby heat an imaging glass part FGC which is a predetermined part (a particular part) using radiative heat from the hood part 21a. The imaging glass part FGC is a part of the front glass FG corresponding to an imaging range of the onboard camera 20. In other words, the onboard camera 20 takes the image of the scene outside the host vehicle 10 through the imaging glass part FGC.

The heat generated by the heater 30 heats the imaging glass part FGC and as a result, if the imaging glass part FGC is clouded owing to moisture, the cloud is removed. In addition, if the imaging glass part FGC is not clouded, heating the imaging glass part FGC prevents the imaging glass part FGC from being clouded.

Figure 3:
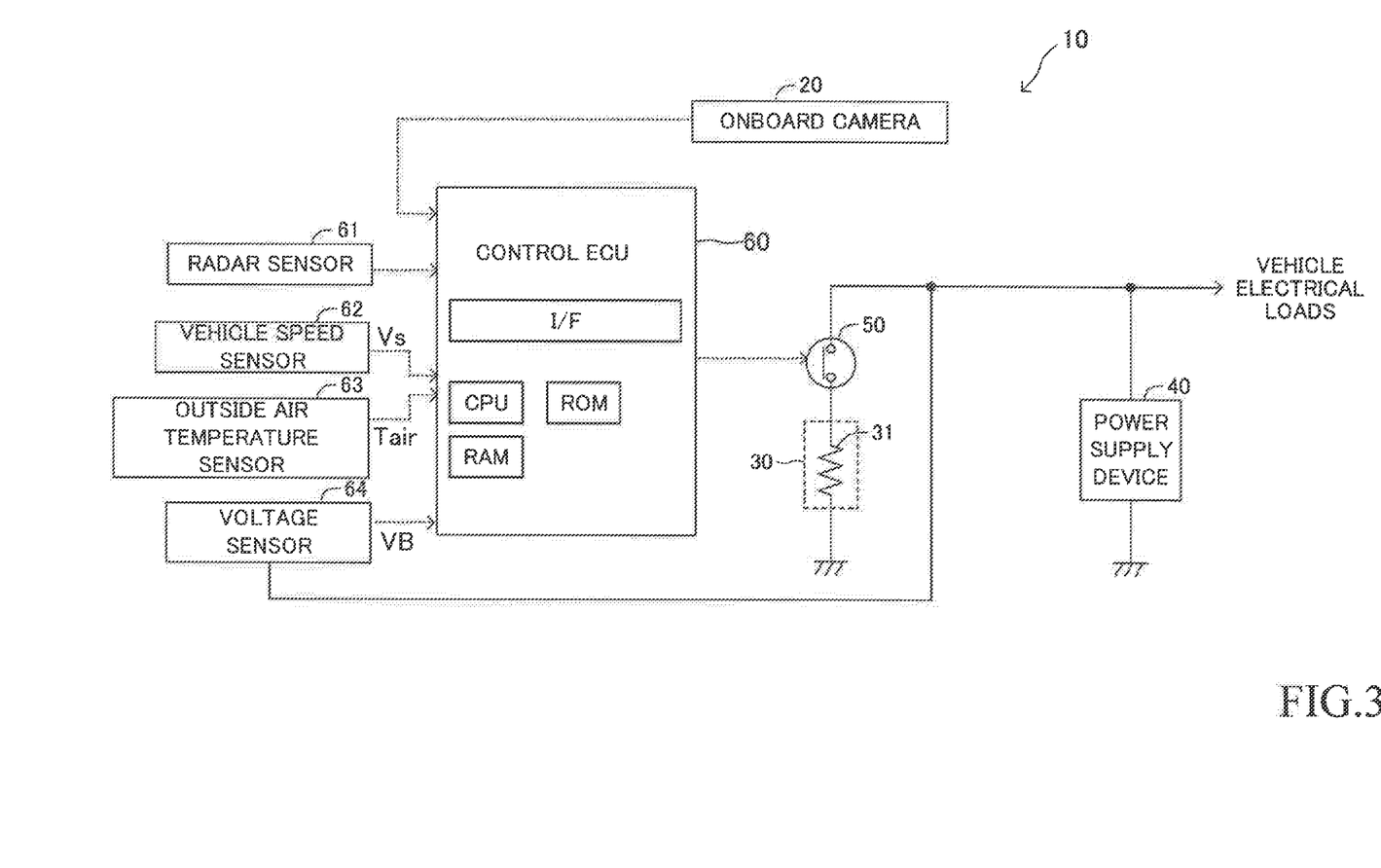
FIG. 3 is a schematic block diagram illustrating the present heating apparatus.

As shown in FIG. 3, the host vehicle 10 further includes a power supply device 40, a relay switch 50, a control ECU 60, and unillustrated another ECUs, in addition to the onboard camera 20 and the heater 30.

In the present specification, each of "ECUs" is an electric control unit comprising a microcomputer as a main part. The microcomputer includes a CPU, a ROM, a RAM, a non-volatile memory, an interface I/F, and the like. The CPU realizes various functions by executing instructions (programs, routines) stored in the ROM. A certain ECU is connected with at least one of the ECUs other than the certain ECU via a CAN (Controller Area Network) which is not illustrated in such a manner that they are capable of mutually transmitting and receiving information.

The power supply device 40 is a power source including "a battery and an alternator (not shown)". The power supply device 40 is unable to supply electric power to the heater 30 and vehicle electrical loads (electrical loads for the host vehicle 10) other than the heater 30, when an ignition key switch (not shown) is positioned at an OFF position. The power supply device 40 is in a state where it is capable of supplying the electric power to the heater 30 and the vehicle electrical loads, when the ignition key switch is positioned at an ON position.

A state of the relay switch 50 is switched between an ON state (a conduction state) and an OFF state (a breaking state) in response to an instruction signal (a driving signal) from the control ECU 60. When the relay switch 50 is in the conduction state, the electric power is supplied from the power supply device 40 to the heater 30. When the relay switch 50 is in the breaking state, connection between the power supply device 40 and the heater 30 is cut off, and thus, the electric power is not supplied from the power supply device 40 to the heater 30.

The control ECU 60 is connected to the relay switch 50. The control ECU 60 transmits the instruction signal to the relay switch 50 to thereby execute an electric power supply control for controlling an electric power supply state of the electric power supplied to the heater 30. The electric power supply control is also referred to as an "energization control of the heater 30". The control ECU 60 can also be referred to as a "glass heating control unit" (also simply referred to as a "control unit" for convenience).

In (throughout) the electric power supply control of the present embodiment, the control ECU 60 continues supplying the electric power to the heater 30 (namely, energizing the electric heating wires 31) for an energization continuation time Ton and then continues stopping supplying the electric power to the heater 30 (namely, stopping energizing the electric heating wires 31) for an energization stop continuation time Toff. Throughout the electric power supply control, the control ECU 60 repeats a cycle including the energization for the time Ton and the stop energization for the time Toff. It should be noted that the sum (Ton+Toff) of the energization continuation time Ton and the energization stop continuation time Toff is set at a constant time T.

The control ECU 60 changes each of a length of the energization continuation time Ton and a length of the energization stop continuation time Toff to thereby control (adjust) an amount of the electric power supplied to the heater 30 from the power supply device 40. That is, the control ECU 60 changes a duty ratio (=Ton/(Ton+Toff)) to thereby control an output (a heat value or a power consumption) of the heater 30. The heat amount generated by the heater 30 per unit time is greater as the amount of the electric power supplied to the heater 30 is greater (namely, as the duty ratio that is proportional to the time Ton is greater).

Furthermore, the control ECU 60 is connected to the above-described onboard camera 20. The control ECU 60 receives the image data which are generated by the onboard camera 20.

Furthermore, the control ECU 60 is connected to sensors described below and receives detected signals or detected information from those sensors.

The radar sensor 61 radiates an electric wave in a millimeter wave band to surroundings of the host vehicle 10 including a front area in front of (ahead of) the host vehicle 10 and receives the millimeter wave (i.e., a reflected wave) reflected from a target object present within a radiation area of the millimeter wave. The radar sensor 61 obtains (detects), every time a predetermined time elapses, "radar sensor detected information" on each of the detected target objects, based on a phase difference between the transmitted millimeter wave and the received reflected wave, a frequency difference between them, an attenuation level of the reflected wave, and a time (a period) from a time point when the millimeter wave is transmitted to a time point when the reflected wave is received. The radar sensor detected information is information on a relative relationship between the host vehicle 10 and the target object. The radar sensor detected information includes "an inter-vehicle distance Dfx, a relative speed Vfx, and a direction θp" of each of the detected target objects.

A vehicle speed sensor 62 generates a detected signal indicative of a vehicle speed Vs of the host vehicle 10. An outside air temperature sensor 63 generates a detected signal indicative of an outside air temperature Tair of air around the host vehicle 10. A voltage sensor 64 generates a detected signal indicative of an output voltage VB of the power supply device 40.

The control ECU 60 executes a recognition/detection process to recognize/detect a preceding vehicle OV (refer to FIG. 4B) of the host vehicle 10 and a lane marker recognition process to recognize lane markers (for example, white lines) of a traveling lane on which the host vehicle 10 is traveling, using the image data obtained from the onboard camera 20. The preceding vehicle OV is another vehicle traveling in front of the host vehicle 10.

When the control ECU 60 has recognized/detected the preceding vehicle OV, the control ECU 60 calculates information (hereinafter, referred to as "camera sensor detected information") including the direction θp of the preceding vehicle OV, "a longitudinal distance Dfx (the inter-vehicle distance Dfx) between the preceding vehicle OV and the host vehicle 10", and the relative speed Vfx of the preceding vehicle OV with respect to the host vehicle 10. It should be noted that if the onboard camera 20 includes a processing part (an image processing ECU), the processing part may calculate the camera sensor detected information and then, may transmit the calculated detected information to the control ECU 60.

The control ECU 60 determines (obtains) target object information (final target object information) of the preceding vehicle OV based on at least one of the "radar sensor detected information" and the "camera sensor detected information".

The target object information includes the following information.

A detection position of the preceding vehicle OV (i.e., a longitudinal distance Dfx referred to as an inter-vehicle distance Dfx, and a lateral position Dfy of the preceding vehicle OV).

A relative speed Vfx of the preceding vehicle OV.

A width W of the preceding vehicle OV (a left-right width W of the preceding vehicle OV).

A height H of the preceding vehicle OV.

An overlapping ratio RP between the preceding vehicle OV and the host vehicle 10.

It should be noted that the overlapping ratio RP is a ratio of "a width of an area where the host vehicle 10 and the preceding vehicle OV overlap each other in the traveling direction of the host vehicle 10" to "a width (a left-right width) of the host vehicle 10".

When both of "the radar sensor detected information" and "the camera sensor detected information" of a certain preceding vehicle OV are detected/obtained, the control ECU 60 fuses (integrates) them to thereby determine (obtain) the target object information as the final target object information of the certain preceding vehicle OV. In contrast, when either "the radar sensor detected information" of the certain preceding vehicle OV or "the camera sensor detected information" of the certain preceding vehicle OV is only detected/obtained, the control ECU 60 obtains (determines) the final target object information of the certain preceding vehicle OV based on the obtained information.

Outline of Operation

Figure 4A:
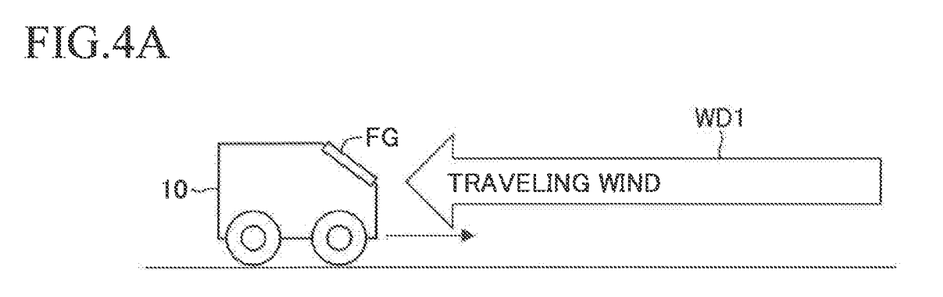
FIG. 4A is a figure for describing an outline of operation of the present heating apparatus.

As shown in FIG. 4A, when the host vehicle 10 is traveling in a case where the other vehicle (the preceding vehicle OV) traveling in front of the host vehicle 10 is not present, the traveling wind WD1 blows toward (hits) the front glass FG of the host vehicle 10. An amount of heat which is removed from the front glass FG per unit time by the traveling wind WD1 (this amount of heat may sometimes be simply referred to as "cooling heat amount of the front glass FG") increases as the traveling wind WD1 becomes stronger.

Therefore, the control ECU 60 extrapolates (or estimates) a strength (magnitude) of the traveling wind WD1 hitting the front glass FG of the host vehicle 10 of when the preceding vehicle OV is not present. More specifically, the control ECU 60 calculates (obtains) a parameter representing the strength of the traveling wind WD1 of when the preceding vehicle OV is not present, based on the vehicle speed Vs. In this embodiment, the parameter representing the strength of the traveling wind WD1 of when the preceding vehicle OV is not present is a wind speed of the traveling wind WD1 and is referred to as an "extrapolated traveling wind speed V1". The control ECU 60 basically controls the electric power supplied to the heater 30 using that extrapolated traveling wind speed V1.

Specifically, it is considered that the cooling heat amount of the front glass FG increases as the extrapolated traveling wind speed V1 becomes greater. Therefore, the control ECU 60 controls the electric power supplied to the heater 30 so as to increase the output (the heat amount, or the power consumption) of the heater 30 by an amount corresponding to an increase amount in the cooling heat amount.

More specifically, the control ECU 60 determines/obtains the extrapolated traveling wind speed V1 based on the vehicle speed Vs of the host vehicle 10. When the preceding vehicle OV is not present in front of the host vehicle 10, the traveling wind WD1 has a relatively high correlation with the vehicle speed Vs, and therefore, an extrapolation accuracy of the extrapolated traveling wind speed V1 can be relatively high. In other words, an error between the extrapolated traveling wind speed V1 and an actual traveling wind speed of a wind actually hitting the front glass FG of the host vehicle 10 due to the traveling of the host vehicle 10 is small. Hereinafter, the wind actually hitting the front glass FG of the host vehicle 10 due to the traveling of the host vehicle 10 is referred to as an "actual traveling wind", and the actual traveling wind speed of the actual traveling wind is referred simply to as an "actual traveling wind speed".

Figure 4B:
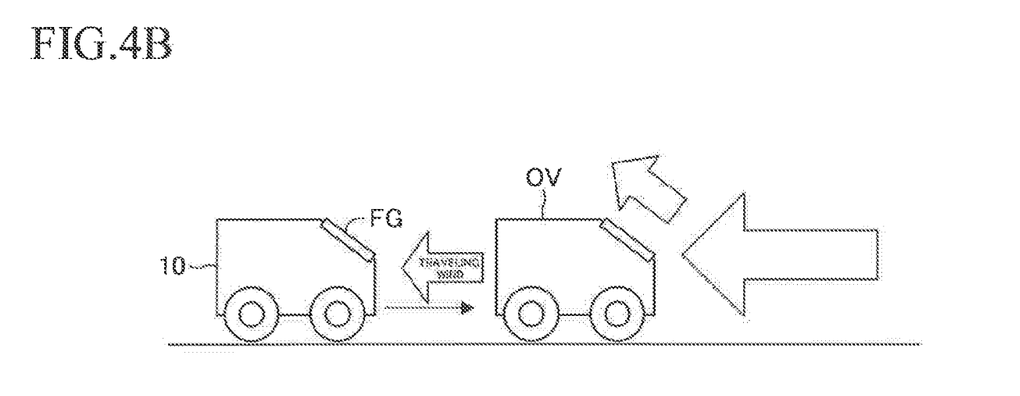
FIG. 4B is a figure for describing the outline of the operation of the present heating apparatus.

In contrast, as shown in FIG. 4B, when the host vehicle 10 is traveling in a case where the preceding vehicle OV is present, a strength (magnitude) of the actual traveling wind becomes different from the strength of the traveling wind WD1 of when the preceding vehicle OV is not present, due to the presence of the preceding vehicle OV. In other words, the correlation between the actual wind speed (or the strength of the actual traveling wind) and the vehicle speed Vs becomes relatively weaker.

Therefore, when the preceding vehicle OV affects the actual traveling wind, the error between the actual traveling wind speed and the extrapolated traveling wind speed V1 which is extrapolated based only on the vehicle speed Vs tends to be large. More specifically, since the actual traveling wind (that hits the front glass FG of the host vehicle 10) tends to be weaker due to the preceding vehicle OV as compared to the traveling wind WD1 of when the preceding vehicle OV is not present, the extrapolated traveling wind speed V1 that does not reflect the influence of the preceding vehicle OV tends to be larger than the actual traveling wind speed.

Therefore, when the preceding vehicle OV (hereinafter, referred to as a "particular preceding vehicle OVp") which affects the actual traveling wind is present, the output of the heater 30 determined based on the extrapolated traveling wind speed V1 is excessively large, as compared to the output of the heater 30 (the appropriate output of the heater 30) necessary and sufficient for preventing the front glass FG from being clouded or for removing the cloud of the front glass FG.

From the above, it is understood that, when the amount of the electric power supplied to the heater 30 is determined based on the extrapolated traveling wind speed V1 in a case where the particular preceding vehicle OVp is present, the output of the heater 30 is likely to become excessively large compared to the appropriate output of the heater 30. This is not preferable because the electric power supplied to the heater 30 may be wasted and/or a temperature of the onboard camera 20 may become excessively high.

In view of the above, the control ECU 60 recognizes/detects the preceding vehicle OV (one or more of the preceding vehicles OV) present within a predetermined area in front of the host vehicle 10. Furthermore, the control ECU 60 obtains the following information including the target object information on the preceding vehicle OV which has been recognized.

- A parameter for evaluating (or representing) a size of the preceding vehicle OV (hereinafter, the parameter is referred to as a "size evaluation parameter").
- An inter-vehicle distance Dfx between the host vehicle 10 and the preceding vehicle OV (i.e., the inter-vehicle distance Dfx of the preceding vehicle OV).
- An overlapping ratio RP between the host vehicle 10 and the preceding vehicle OV (i.e., the overlapping ratio RP of the preceding vehicle OV).

It should be noted that the size evaluation parameter is a parameter related to the size of the preceding vehicle OV, and is the height H of the preceding vehicle OV in this embodiment. As long as the size evaluation parameter is greater as the size of the preceding vehicle OV is larger, the parameter may be a parameter other than the height H of the preceding vehicle OV. For example, the size evaluation parameter may be a width W of the preceding vehicle OV or an area S (=a product (W×H) of the width W of the preceding vehicle OV and the height H of the preceding vehicle OV) of the preceding vehicle OV.

The control ECU 60 selects (specifies), based on the above-described information including the target object information on the preceding vehicle OV, one or more of the particular preceding vehicles OVp among the one or more preceding vehicles OV which have been recognized/detected. More specifically, the control ECU 60 selects/determines the preceding vehicles OV as the "particular preceding vehicles OVp" when the inter-vehicle distance Dfx of that preceding vehicle OV is equal to or smaller than a predetermined inter-vehicle distance threshold Dfxth and the overlapping ratio RP of that preceding vehicle OV is equal to or larger than a predetermined overlapping ratio threshold RPth.

The control ECU 60 corrects the extrapolated traveling wind speed V1 using a traveling wind influence parameter having a correlation with influence of the particular preceding vehicle OVp on the strength of the traveling wind WD1. It can be said that the traveling wind influence parameter has a correlation with a degree (or an influence degree) indicative of or corresponding to how the particular preceding vehicle OVp reduces/weakens the strength of the traveling wind WD1. The degree can be said to be a decrease degree (attenuation degree) of the traveling wind WD1 due to the preceding vehicle OV. Further, the degree can be said to be the influence degree of the particular preceding vehicle OVp on the strength of the actual traveling wind (i.e., the strength of wind caused by traveling of the host vehicle 10 and hitting the front glass FG). The traveling wind influence parameter is at least one of (in this embodiment, all of) the size evaluation parameter on the particular preceding vehicle OVp, the inter-vehicle distance Df of the particular preceding vehicle OVp, the overlapping ratio RP of the particular preceding vehicle OVp, and the number Nm of the particular preceding vehicles OVp.

The control ECU 60 corrects, using the traveling wind influence parameter(s), the extrapolated traveling wind speed V1 that is extrapolated based on the vehicle speed Vs in such a manner that the influence on the traveling wind WD1 by the particular preceding vehicle OVp is reflected in the extrapolated traveling wind speed. Hereinafter, the thus corrected traveling wind speed is referred to as a "corrected extrapolated traveling wind speed V2".

In this embodiment, the corrected extrapolated traveling wind speed V2 is calculated/obtained by multiplying the extrapolated traveling wind speed V1 by a total degrease ratio (or an influence coefficient) a (i.e., V2=α×V1). The total degrease ratio α is a value larger than 0 and equal to or smaller than 1. The value of the total degrease ratio α is determined based on the traveling wind influence parameter (s).

Here, if the preceding vehicle(s) OV (the particular preceding vehicle(s) OVp) is present, the actual traveling wind and the traveling wind WD1 have the following tendencies.

- The traveling wind WD1 has a tendency to be weaken more greatly to be the actual traveling wind as the size evaluation parameter of the particular preceding vehicle OVp becomes greater. In other words, the decrease degree of the traveling wind WD1 to the actual traveling wind becomes greater as the size evaluation parameter of the particular preceding vehicle OVp becomes greater.
- The traveling wind WD1 has a tendency to be weaken more greatly to the actual traveling wind as the inter-vehicle distance Dfx becomes shorter. In other words, the decrease degree of the traveling wind WD1 to the actual traveling wind becomes greater as the inter-vehicle distance Dfx becomes shorter.
- The traveling wind WD1 has a tendency to be weaken more greatly to the actual traveling wind as the overlapping ratio RP of the particular preceding vehicle OVp becomes larger. In other words, the decrease degree of the traveling wind WD1 to the actual traveling wind becomes greater as the overlapping ratio RP of the particular preceding vehicle OVp becomes larger.
- The traveling wind WD1 has a tendency to be weaken more greatly to be the actual traveling wind as the number Nm of the particular preceding vehicles OVp increases. In other words, the decrease degree of the traveling wind WD1 to the actual traveling wind becomes greater as the number Nm of the particular preceding vehicles OVp increases.

Therefore, in order for the control ECU 60 to correct the extrapolated traveling wind speed V1 more accurately so as to obtain/extrapolate the actual traveling speed more accurately, the value of the total degrease ratio α is determined based on the traveling wind influence parameter(s) in the following manner.

- The value of the total degrease ratio α is determined so as to become smaller within a range larger than 0 and equal to or smaller than 1 as the height H (i.e., the size evaluation parameter) of the particular preceding vehicle OVp becomes larger.
- The value of the total degrease ratio α is determined so as to become smaller within the range larger than 0 and equal to or smaller than 1 as the inter-vehicle distance Dfx of the particular preceding vehicle OVp becomes shorter.
- The value of the total degrease ratio α is determined so as to become smaller within the range larger than 0 and equal to or smaller than 1 as the overlapping ratio RP of the particular preceding vehicle OVp becomes larger.
- The value of the total degrease ratio α is determined so as to become smaller within the range larger than 0 and equal to or smaller than 1 as the number Nm of the particular preceding vehicles OVp increases.

As described above, the corrected extrapolated traveling wind speed V2 is calculated by multiplying the extrapolated traveling wind speed V1 by the total degrease ratio $\alpha$ ($0<\alpha\leq 1$). Therefore, the corrected extrapolated traveling wind speed V2 becomes smaller as the value of the total degrease ratio $\alpha$ becomes smaller. In this manner, the extrapolated traveling wind speed V1 can accurately be corrected to be the corrected extrapolated traveling wind speed V2 that is closer to the actual traveling wind speed.

The corrected extrapolated traveling wind speed V2 calculated in this manner becomes equal to or smaller than the extrapolated traveling wind speed V1. The control ECU 60 controls the amount of the electric power supplied to the heater 30 using the corrected extrapolated traveling wind speed V2. Accordingly, when the corrected extrapolated traveling wind speed V2 is smaller than the extrapolated traveling wind speed V1, the amount of the electric power supplied to the heater 30 is set/controlled to be smaller than the amount of the electric power determined based on the extrapolated traveling wind speed V1.

As described the above, when the cooling heat amount of the front glass FG due to the traveling wind decreases under the influence of the particular preceding vehicle OVp, the control ECU 60 can reduce the output of the heater 30 by an amount corresponding to the decrease in the cooling heat amount of the front glass FG. Therefore, even when the preceding vehicle OV is present, the control ECU 60 can appropriately control the output of the heater 30.

Specific Operation

Figure 5:
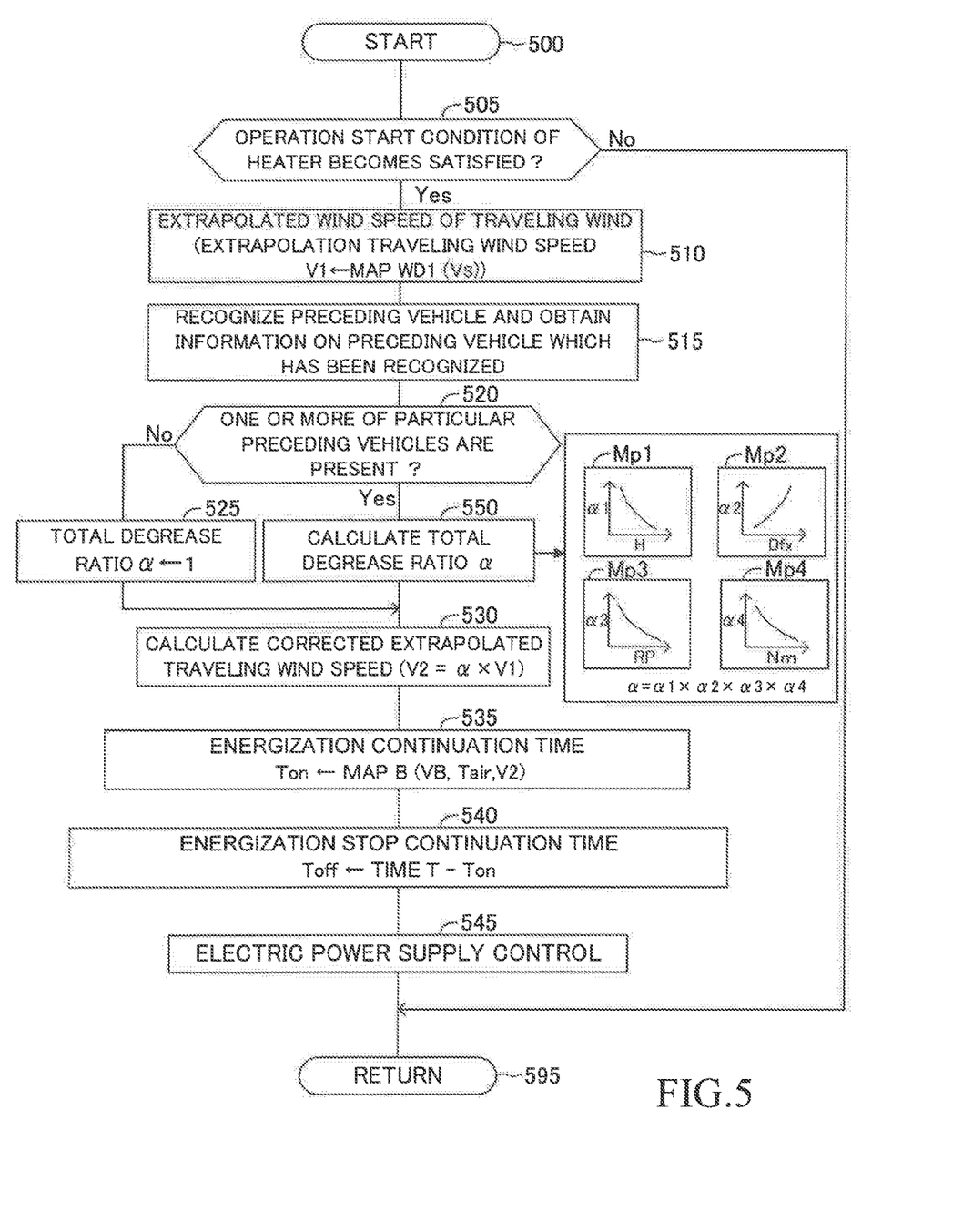
FIG. 5 is a flowchart showing a routine executed by a CPU of a control ECU of the present heating apparatus.

The CPU of the control ECU 60 is configured to execute a routine represented by a flowchart shown in FIG. 5, every time a predetermined time elapses, while the ignition key switch is positioned at the ON position. Therefore, when a predetermined timing (an appropriate time point) arrives in a case where the ignition key switch is positioned at the ON position, the CPU starts processing from step 500 and proceeds to step 505.

At step 505, the CPU determines whether or not an operation start condition of the heater 30 is satisfied.

The operation start condition of the heater 30 is a condition to be satisfied when all of the following conditions 1 and 2 are satisfied.

The condition 1: the condition 1 is a condition to be satisfied when the outside air temperature Tair which the outside air temperature sensor 63 is detecting is equal to or lower than an outside air temperature threshold. It should be noted that the outside air temperature threshold has been set at an appropriate value determined based on a certain temperature above which the front glass FG is deemed to be unlikely to be clouded.

The condition 2: the condition 2 is a condition to be satisfied when an operation stopped state where the electric power is not supplied to the heater 30 has continued for a predetermined time or longer.

When the operation start condition of the heater 30 is not satisfied, the CPU makes a "No" determination at step 505 and proceeds to step 595 so as to tentatively terminate the present routine.

In contrast, when the operation start condition of the heater 30 is satisfied, the CPU makes a "Yes" determination at step 505, and sequentially executes the processes of steps 510 and 515 described below. Thereafter, the CPU proceeds to step 520.

Step 510: the CPU calculates/obtains the extrapolated traveling wind speed V1 based on the vehicle speed Vs of the host vehicle 10. More specifically, the CPU applies the detected vehicle speed Vs to a lookup table MapWD1(Vs) which has been stored in the ROM in advance to thereby calculate/obtain the extrapolated traveling wind speed V1. The lookup table MapWD1(Vs) is a lookup table which defines "a relationship between the vehicle speed Vs and the extrapolated traveling wind speed V1" of when the preceding vehicle OV is not present. The lookup table MapWD1(Vs) has been obtained through experimentation.

Step 515: the CPU executes the recognition/detection process of the preceding vehicle OV. When the CPU has detected the preceding vehicle OV, the CPU obtains the information (the height H of the preceding vehicle OV, the inter-vehicle distance Dfx of the preceding vehicle OV, and the overlapping ratio RP of the preceding vehicle OV) on the preceding vehicle OV which has been detected.

At step 520, the CPU determines whether or not one or more of the particular preceding vehicles OVp (i.e., the preceding vehicles OV, each affecting the actual traveling wind) are present among one or more of the preceding vehicles OV which have been detected. It should be noted that the CPU determines whether or not the preceding vehicle OV which has been detected is the particular preceding vehicle OVp as follows. That is, when the preceding vehicle OV satisfies the following condition A, the CPU determines that that preceding vehicle OV is the particular preceding vehicle OVp.

The condition A: the condition A is a condition to be satisfied when the inter-vehicle distance Dfx of the preceding vehicle OV is equal to or smaller than the predetermined inter-vehicle distance threshold Dfxth and the overlapping ratio RP of the preceding vehicle OV is equal to or larger than the predetermined overlapping ratio threshold RPth. It should be noted that the predetermined inter-vehicle distance threshold Dfth and the predetermined overlapping ratio threshold RPth have been set at respective appropriate values for the above determinations. Those values have been obtained through experimentations performed in advance.

When it is determined that no particular preceding vehicle OVp is present (including a case where the preceding vehicle OV has not been recognized/detected), the CPU makes a "No" determination at step 520 and sequentially executes the processes of steps 525 to 545 described below. Thereafter, the CPU proceeds to step 595 to tentatively terminate the present routine.

Step 525: the CPU sets the value of the total degrease ratio $\alpha$ to "1".

Step 530: the CPU multiplies the extrapolated traveling wind speed V1 calculated/obtained at step 510 by the total degrease ratio $\alpha$ (which has been set at step 525 and is "1" at the present time point) to thereby obtain the corrected extrapolated traveling wind speed V2. Since the total degrease ratio $\alpha$ is "1" at this time point, the extrapolated traveling wind speed V1 is not corrected at step 530. In other words, in this case, the extrapolated traveling wind speed V1 is used as the corrected extrapolated traveling wind speed V2.

Step 535: the CPU determines/obtains the energization continuation time Ton, based on the output voltage VB, the outside air temperature Tair, and the corrected extrapolated traveling wind speed V2. More specifically, the CPU applies the output voltage VB, the outside air temperature Tair, and the corrected extrapolated traveling wind speed V2 to a map Map B (VB, Tair, V2) to thereby determine the energization continuation time Ton.

According to that map Map B (VB, Tair, V2), the energization continuation time Ton becomes shorter as the output voltage VB becomes higher. In addition, the energization continuation time Ton becomes shorter as the corrected extrapolated traveling wind speed V2 becomes smaller. According to that map Map B (VB, Tair, V2), the energization continuation time Ton are obtained in such a manner that:

the energization continuation time Ton becomes shorter as the output voltage VB becomes higher;

the energization continuation time Ton becomes shorter as the outside air temperature Tair becomes higher; and the energization continuation time Ton becomes shorter as the corrected extrapolated traveling wind speed V2 becomes smaller.

That is, the amount of the electric power supplied to the heater 30 through the process of step 545 described later is reduced as the corrected extrapolated traveling wind speed V2 becomes smaller.

Step 540: the CPU subtracts the energization continuation time Ton from the constant time T to thereby obtain/determine the energization stop continuation time Toff (i.e., Toff=constant time T−Ton).

Step 545: the CPU performs the electric power supply control. More specifically, the CPU supplies the electric power to the heater 30 for the energization continuation time Ton by making the relay switch 50 in the ON state, and stops supplying the electric power for the electric energization stop continuation time Toff by making the relay switch 50 in the OFF state. The CPU repeats this cyclic operation.

It should be noted that the CPU automatically ends the electric power supply control after a constant time that is sufficiently longer than the constant time T elapses from an execution start time point at which the operation start condition of the heater 30 was determined to be satisfied at step 505 through executing an unillustrated routine. It should be noted that the CPU continues executing the electric power supply control until a predetermined time that is sufficiently longer than the constant time T elapses from an execution start time point at which the operation start condition of the heater 30 was determined to be satisfied at step 505.

Meanwhile, when one or more of the particular preceding vehicles OVp are present at a time point at which the process of the step 520 is executed, the CPU makes a "Yes" determination at step 520 and executes a process of step 550 described below, and then proceeds to step 530.

Step 550: the CPU calculates/obtains the total degrease ratio α based on the traveling wind influence parameters of the particular preceding vehicles OVp using look-up tables (map) Mp1 to Mp4 shown in FIG. 5.

More specifically, assuming that there is only one particular preceding vehicle OVp, the CPU applies the height H of that particular preceding vehicle OVp to the first map Mp1 so as to obtain a first degrease ratio α1, the CPU applies the inter-vehicle distance Dfx of that particular preceding vehicle OVp to the second map Mp2 so as to obtain a second degrease ratio α2, the CPU applies the overlapping ratio RP of that particular preceding vehicle OVp to the third map Mp3 so as to obtain a third degrease ratio α3, and the CPU applies the number Nm that is "1" in this case to the fourth map Mp4 so as to obtain a fourth degrease ratio α4. Thereafter, the CPU obtains/calculates a product of the first degrease ratio α1 to the fourth degrease ratio α4 to thereby obtain the total degrease ratio α, as follows.

The total degrease ratio α=the first degrease ratio α1×the second degrease ratio α2×the third degrease ratio α3×the fourth degrease ratio α4

Whereas, when two or more of the particular preceding vehicles OVp are present, the CPU obtains representative traveling wind influence parameters regarding "the height H, the inter-vehicle distance Dfx, and the overlapping ratio RP" to obtain the degrease ratios α1 to α3.

Namely, the CPU calculates, based on the height H of each of the particular preceding vehicles OVp, a representative height H that is applied to the map Mp1 to obtain the first degrease ratio α1. The CPU calculates, based on the inter-vehicle distance Dfx of each of the particular preceding vehicles OVp, a representative inter-vehicle distance Dfx that is applied to the map Mp2 to obtain the second degrease ratio α2. The CPU calculates, based on the overlapping ratio RP of each of the particular preceding vehicles OVp, a representative overlapping ratio RP that is applied to the map Mp3 to obtain the second degrease ratio α3. That is, representative values determined/calculated based on "the heights H, the inter-vehicle distances Dfx, and the overlapping ratios RP" of the two or more particular preceding vehicles OVp are used as "the height H, the inter-vehicle distance Dfx, and the overlapping ratio RP" to obtain the degrease ratios α1 to α3. For example, each of the representative values is a weighted average value of the corresponding values. In such a case, it is preferable that the weighting (i.e. calculating the weighted average) be performed by taking into consideration a degree indicative of or corresponding to how each of the particular preceding vehicles OVp affects the strength of the traveling wind WD1. For example, the weighting (i.e. calculating the weighted average) may be performed in such a manner that a weight (a weighting coefficient) with respect to a parameter (i.e., H, Dfx, or RP) of the certain particular preceding vehicle OVp is greater as that certain particular preceding vehicle OVp is closer to the host vehicle 10).

When two or more of the particular preceding vehicles OVp are present, the CPU obtains the first degrease ratios α1, α2, and α3, as described above, and applies the number Nm of the particular preceding vehicles OVp to the fourth map Mp4 so as to obtain the fourth degrease ratio α4. Then, the CPU obtains the total degrease ratio α by multiplying a "product of the first degrease ratio α1 to the third degrease ratio α3" by the "fourth degrease ratio α4".

It should be noted that, according to the first map Mp1, the value of the first degrease ratio α1 is determined so as to be become smaller within a range larger than 0 and smaller than 1 as the height H of the preceding vehicle OV becomes greater. According to the second map Mp2, the value of the second degrease ratio α2 is determined so as to become smaller within the range larger than 0 and smaller than 1 as the inter-vehicle distance Dfx of the preceding vehicle OV becomes shorter. According to the third map Mp3, the value of the third degrease ratio α3 is determined so as to become smaller within the range larger than 0 and smaller than 1 as the overlapping ratio RP of the preceding vehicle OV becomes larger. According to the fourth map Mp4, the value of the fourth degrease ratio α4 is determined so as to become smaller within the range larger than 0 and smaller than 1 as the number Nm of the preceding vehicles OV increases.

Thereafter, at step 530, the CPU multiples the extrapolated traveling wind speed V1 which has been calculated at step 510 by the total degrease ratio α (0<α<1) to thereby calculate the corrected extrapolated traveling wind speed V2. As a result, the extrapolated traveling wind speed V1 is corrected (reduced) in such a manner that a degree of reduction/decrease of the extrapolated traveling wind speed V1 becomes greater as the total degrease ratio α (0<α<1) becomes smaller, and the extrapolated traveling wind speed V1 (the corrected extrapolated traveling wind speed V1) that has been corrected in this manner is employed as the corrected extrapolated traveling wind speed V2 for determining energization continuation time Ton.

Thereafter, at step 535, the CPU applies the output voltage VB, the outside air temperature Tair, and the corrected extrapolated traveling wind speed V2 which has been obtained at step 530 to the map Map B to thereby determine the energization continuation time Ton. As a result, the energization continuation time Ton becomes shorter than that of when the extrapolated traveling wind speed V1 is applied to the map Map B. Therefore, the amount of the electric power supplied to the heater 30 through the process of step 535 is reduced (becomes smaller) as compared with a case where the extrapolated traveling wind speed V1 is applied to the map Map B. Thereafter, the CPU executes the processes of steps 535 to 545 sequentially and then, proceeds to step 595 to tentatively terminate the present routine.

As has been describe above, the present heating apparatus can appropriately control the output of the heater 30 even when the preceding vehicle OV is present.

Although the embodiment of the present invention has been specifically described above, the present invention is not limited to the above embodiment, and various modified examples based on the technical idea within the scope of the present invention can be employed/adopted.

For example, at step 550 shown in FIG. 5, the total degrease ratio α may be a product of two or three ratios of the first degrease ratio α1 to the fourth degrease ratio α4. Alternatively, the total degrease ratio α may be equal to one of the first degrease ratio α1 to the third degrease ratio α3. When there are two or more of the particular preceding vehicles OVp, the vehicle that is closest to the host vehicle 10 or the vehicle whose overlapping ratio LR is the greatest, among the particular preceding vehicles OVp, may be treated as the particular preceding vehicle OVp for determining the total degrease ratio α. Furthermore, at step 550 shown in FIG. 5, in place of the calculation of the total degrease ratio α, the total degrease ratio α may be set to only one of the first degrease ratio α1 to the fourth degrease ratio α4.

A voltage adjusting circuit for adjusting the voltage applied to the heater 30 may be provided on an upstream side of the relay switch 50. In this case, the CPU determines a target electric supply amount per unit time based on the outside air temperature Tair; and any one of the extrapolated traveling wind speed V1 and the corrected extrapolated traveling wind speed V2. Then, the CPU adjusts the voltage applied to the heater 30 through the voltage adjusting circuit, so as to supply the electric power equal to the determined target electric supply amount to the heater 30.

Figure 6:
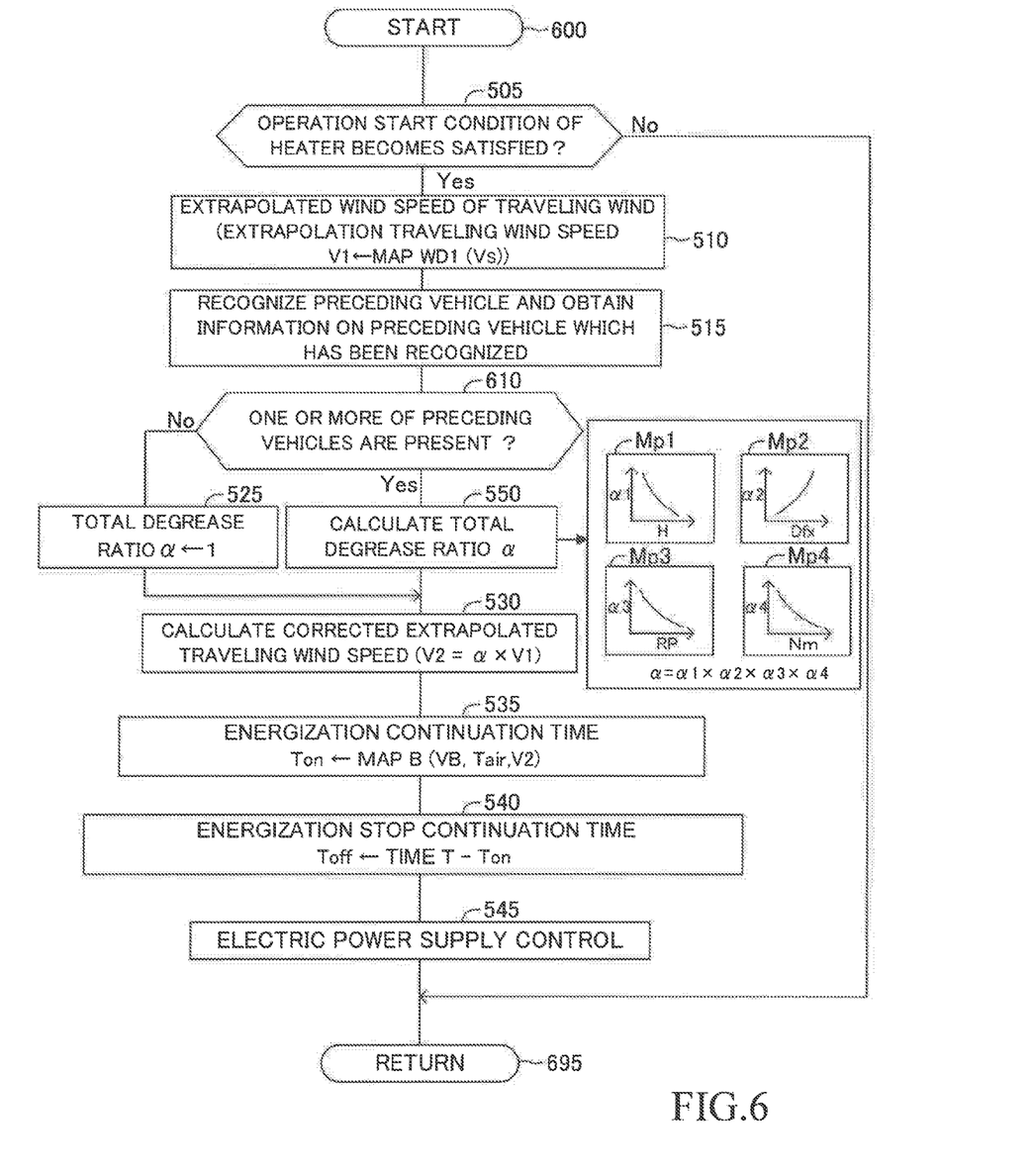
FIG. 6 is a flowchart showing a routine executed by the CPU of the control ECU of a modified embodiment.

For example, the present heating apparatus may be configured to execute a routine represented by a flowchart in FIG. 6 in place of the routine represented by the flowchart in FIG. 5. The routine of FIG. 6 is different from the routine of FIG. 5 only in that step 520 is replaced by step 610 described below.

Step 610: the CPU determines whether or not the preceding vehicle OV is present (one or more of the preceding vehicles OV are present). That is, at step 515, the CPU determines whether or not the preceding vehicle OV has been recognized.

In this case, at step 550 of FIG. 6, the value of the total degrease ratio α is determined based on the traveling wind influence parameter on one more of the preceding vehicles OV which have been recognized. It should be noted that, at step 550 in FIG. 6, when the inter-vehicle distance Dfx is equal to or larger than the predetermined inter-vehicle distance threshold Dfxth, the value of the second degrease ratio α2 may be set to "1". Furthermore, when the overlapping ratio RP is equal to or smaller than the predetermined overlapping ratio threshold RPth, the value of the third degrease ratio α3 may be set to "1".

The CPU may be configured to determine the energization continuation time Ton (namely, the electric power supplied to the heater 30) based on the vehicle speed Vs, the output voltage VB, the outside air temperature Tair and the total degrease ratio α using an look-up table (i.e., Ton=MapC (VB, Tair, Vs, α)), without obtaining the extrapolated traveling wind speed V1 and/or the corrected extrapolated traveling wind speed V2.

What is claimed is:

1. A heating apparatus of a front window glass of a host vehicle, said heating apparatus including:
    a camera configured to take an image of an outside of said host vehicle through a particular part of said front window glass from an inside of said host vehicle to thereby obtain front image data used for a driving support of said host vehicle;
    a vehicle speed sensor configured to detect a vehicle speed of said host vehicle;
    a heater, disposed inside said host vehicle so as to face with said particular part, and configured to generate heat for heating said particular part, an amount of said heat corresponding to an amount of electric power supplied from an electric power source of said host vehicle to said heater; and
    a control unit configured to control said amount of said electric power supplied to said heater based on said detected vehicle speed and information on a preceding vehicle traveling in front of said host vehicle, said information being obtained based on data including said front image data,
    wherein,
    said control unit is configured to:
    obtain a traveling wind influence parameter as said information on said preceding vehicle, said traveling wind influence parameter having a correlation with influence degree of said preceding vehicle on strength of wind caused by traveling of said host vehicle and hitting said front window glass of said host vehicle;
    increase said amount of said electric power supplied to said heater as said vehicle speed becomes higher; and
    decrease said amount of said electric power supplied to said heater as said influence degree becomes greater, said influence degree being extrapolated based on said traveling wind influence parameter,
    and wherein,
    said traveling wind influence parameter includes a size evaluation parameter having a correlation with a size of said preceding vehicle; and
    said control unit is configured to extrapolate said influence degree in such a manner that said influence degree becomes greater as said size evaluation parameter becomes greater.

2. A heating apparatus of a front window glass of a host vehicle, said heating apparatus including:
    a camera configured to take an image of an outside of said host vehicle through a particular part of said front window glass from an inside of said host vehicle to thereby obtain front image data used for a driving support of said host vehicle;

a vehicle speed sensor configured to detect a vehicle speed of said host vehicle;

a heater, disposed inside said host vehicle so as to face with said particular part, and configured to generate heat for heating said particular part, an amount of said heat corresponding to an amount of electric power supplied from an electric power source of said host vehicle to said heater; and a control unit configured to control said amount of said electric power supplied to said heater based on said detected vehicle speed and information on a preceding vehicle traveling in front of said host vehicle, said information being obtained based on data including said front image data, wherein, said control unit is configured to:

obtain a traveling wind influence parameter as said information on said preceding vehicle, said traveling wind influence parameter having a correlation with influence degree of said preceding vehicle on strength of wind caused by traveling of said host vehicle and hitting said front window glass of said host vehicle;

increase said amount of said electric power supplied to said heater as said vehicle speed becomes higher; and decrease said amount of said electric power supplied to said heater as said influence degree becomes greater, said influence degree being extrapolated based on said traveling wind influence parameter, and wherein, said traveling wind influence parameter includes an inter-vehicle distance of said preceding vehicle, said inter-vehicle distance being a distance between said host vehicle and said preceding vehicle; and said control unit is configured to extrapolate said influence degree in such a manner that said influence degree becomes greater as said inter-vehicle distance of said preceding vehicle becomes shorter.

3. A heating apparatus of a front window glass of a host vehicle, said heating apparatus including:

a camera configured to take an image of an outside of said host vehicle through a particular part of said front window glass from an inside of said host vehicle to thereby obtain front image data used for a driving support of said host vehicle;

a vehicle speed sensor configured to detect a vehicle speed of said host vehicle;

a heater, disposed inside said host vehicle so as to face with said particular part, and configured to generate heat for heating said particular part, an amount of said heat corresponding to an amount of electric power supplied from an electric power source of said host vehicle to said heater; and a control unit configured to control said amount of said electric power supplied to said heater based on said detected vehicle speed and information on a preceding vehicle traveling in front of said host vehicle, said information being obtained based on data including said front image data, wherein, said control unit is configured to:

obtain a traveling wind influence parameter as said information on said preceding vehicle, said traveling wind influence parameter having a correlation with influence degree of said preceding vehicle on strength of wind caused by traveling of said host vehicle and hitting said front window glass of said host vehicle;

increase said amount of said electric power supplied to said heater as said vehicle speed becomes higher; and decrease said amount of said electric power supplied to said heater as said influence degree becomes greater, said influence degree being extrapolated based on said traveling wind influence parameter, and wherein, said traveling wind influence parameter includes an overlapping rate of said preceding vehicle with respect to said host vehicle; and said control unit is configured to extrapolate said influence degree in such a manner that said influence degree becomes greater as said overlapping rate becomes larger.

4. A heating apparatus of a front window glass of a host vehicle, said heating apparatus including:

a camera configured to take an image of an outside of said host vehicle through a particular part of said front window glass from an inside of said host vehicle to thereby obtain front image data used for a driving support of said host vehicle;

a vehicle speed sensor configured to detect a vehicle speed of said host vehicle;

a heater, disposed inside said host vehicle so as to face with said particular part, and configured to generate heat for heating said particular part, an amount of said heat corresponding to an amount of electric power supplied from an electric power source of said host vehicle to said heater; and a control unit configured to control said amount of said electric power supplied to said heater based on said detected vehicle speed and information on a preceding vehicle traveling in front of said host vehicle, said information being obtained based on data including said front image data, wherein, said control unit is configured to:

obtain a traveling wind influence parameter as said information on said preceding vehicle, said traveling wind influence parameter having a correlation with influence degree of said preceding vehicle on strength of wind caused by traveling of said host vehicle and hitting said front window glass of said host vehicle;

increase said amount of said electric power supplied to said heater as said vehicle speed becomes higher; and decrease said amount of said electric power supplied to said heater as said influence degree becomes greater, said influence degree being extrapolated based on said traveling wind influence parameter, and wherein, said traveling wind influence parameter includes the number of said preceding vehicles; and said control unit is configured to extrapolate said influence degree in such a manner that said influence degree becomes greater as the number of said preceding vehicles increases.

* * * * *